(12) United States Patent
Muto (10) Patent No.: US 9,438,125 B2
(45) Date of Patent: Sep. 6, 2016

(54) POWER CONVERSION APPARATUS AND POWER CONVERSION METHOD WITH PHASE CONTROL

(71) Applicant: Toyota Jidosha Kabushiki Kaisha, Toyota-shi Aichi-ken (JP)

(72) Inventor: Jun Muto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/282,405

(22) Filed: May 20, 2014

(65) Prior Publication Data

US 2014/0347889 A1   Nov. 27, 2014

(30) Foreign Application Priority Data

May 21, 2013   (JP) .................. 2013-107415

(51) Int. Cl.
*H02M 3/335*   (2006.01)

(52) U.S. Cl.
CPC ..... *H02M 3/33584* (2013.01); *H02M 3/33561* (2013.01); *H02M 3/33546* (2013.01)

(58) Field of Classification Search
CPC ................. H02M 3/33569; H02M 3/33584
USPC ........................................................ 363/17
See application file for complete search history.

(56) References Cited

U.S. PATENT DOCUMENTS

| | | | | |
|---|---|---|---|---|
| 7,796,406 B2 * | 9/2010 | Lev | | 363/21.02 |
| 2011/0198933 A1 | 8/2011 | Ishigaki et al. | | |
| 2011/0254379 A1 * | 10/2011 | Madawala | | H02J 5/005 307/104 |
| 2012/0169131 A1 * | 7/2012 | Choudhary | | H02J 5/005 307/104 |
| 2013/0207482 A1 * | 8/2013 | Madawala | | H02M 3/33561 307/104 |
| 2013/0322128 A1 * | 12/2013 | Takegami | | 363/17 |
| 2014/0346871 A1 * | 11/2014 | Hirano | | H02M 3/33584 307/24 |
| 2014/0347890 A1 * | 11/2014 | Hirano | | H02M 3/33561 363/17 |
| 2014/0347891 A1 * | 11/2014 | Muto | | H02M 3/33561 363/17 |
| 2014/0347892 A1 * | 11/2014 | Muto | | H02M 3/33584 363/17 |
| 2015/0015181 A1 * | 1/2015 | Kondo | | H02M 3/33584 320/103 |
| 2015/0138840 A1 * | 5/2015 | Muto | | H02M 3/33592 363/17 |
| 2015/0295445 A1 * | 10/2015 | Hasegawa | | H02J 7/007 320/107 |
| 2015/0295503 A1 * | 10/2015 | Muto | | H02M 3/3353 363/17 |

FOREIGN PATENT DOCUMENTS

JP   2011-193713 A   9/2011

* cited by examiner

*Primary Examiner* — Jessica Han
*Assistant Examiner* — David A. Singh
(74) *Attorney, Agent, or Firm* — Dinsmore & Shohl LLP (57) ABSTRACT

A power conversion apparatus includes a primary side circuit and a secondary side circuit magnetically coupled to the primary side circuit via a transformer, and converts power between a primary side port of the primary side circuit and a secondary side port of the secondary side circuit, using switching of each of the primary side circuit and the secondary side circuit. The power conversion apparatus further includes a control unit that controls a frequency of the switching and a phase difference between the switching of the primary side circuit and the switching of the secondary side circuit such that power conversion efficiency between the primary side port and the secondary side port is increased.

14 Claims, 3 Drawing Sheets

POWER CONVERSION APPARATUS AND POWER CONVERSION METHOD WITH PHASE CONTROL

INCORPORATION BY REFERENCE

The disclosure of Japanese Patent Application No. 2013-107415 filed on May 21, 2013 including the specification, drawings and abstract is incorporated herein by reference in its entirety.

BACKGROUND OF THE INVENTION

1. Field of the Invention

The invention relates to a power conversion performed between a primary side circuit and a secondary side circuit that is magnetically coupled to the primary side circuit via a transformer.

2. Description of Related Art

A conventional power conversion apparatus can adjust an amount of power transmitted between a primary side circuit and a secondary side circuit by changing a phase difference between a switching operation of the primary side circuit and a switching operation of the secondary side circuit (see Japanese Patent Application Publication No. 2011-193713 (JP 2011-193713 A), for example).

SUMMARY OF THE INVENTION

However, when the phase difference between the switching of the primary side circuit and the switching of the secondary side circuit is reduced to a small value, power conversion efficiency between the primary side circuit and the secondary side circuit is reduced. An object of the invention is to provide a power conversion apparatus and a power conversion method capable of suppressing the reduction in power conversion efficiency between the primary side circuit and the secondary side circuit.

A first aspect of the invention is a power conversion apparatus including a primary side circuit, a secondary side circuit magnetically coupled to the primary side circuit via a transformer, and a control unit increasing a frequency of switching of each of the primary side circuit and the secondary side circuit and a phase difference between the switching of the primary side circuit and the switching of the secondary side circuit such that power conversion efficiency between the primary side circuit and the secondary side circuit is increased.

A second aspect of the invention is a power conversion apparatus including a primary side circuit and a secondary side circuit magnetically coupled to the primary side circuit via a transformer in which power conversion efficiency between the primary side circuit and the secondary side circuit is reduced to a smaller value as a phase difference between switching of the primary side circuit and switching of secondary side circuit is smaller. The power conversion apparatus includes a control unit increasing the phase difference by increasing a frequency of the switching of each of the primary side circuit and the secondary side circuit.

A third aspect of the invention is a power conversion method including changing a frequency of switching of each of a primary side circuit and a secondary side circuit magnetically coupled to the primary side circuit via a transformer, and a phase difference between the switching of the primary side circuit and the switching of the secondary side circuit in accordance with power conversion efficiency between the primary side circuit and the secondary side circuit.

According to each aspect of the invention, it is possible to suppress the reduction in power conversion efficiency between the primary side circuit and the secondary side circuit.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
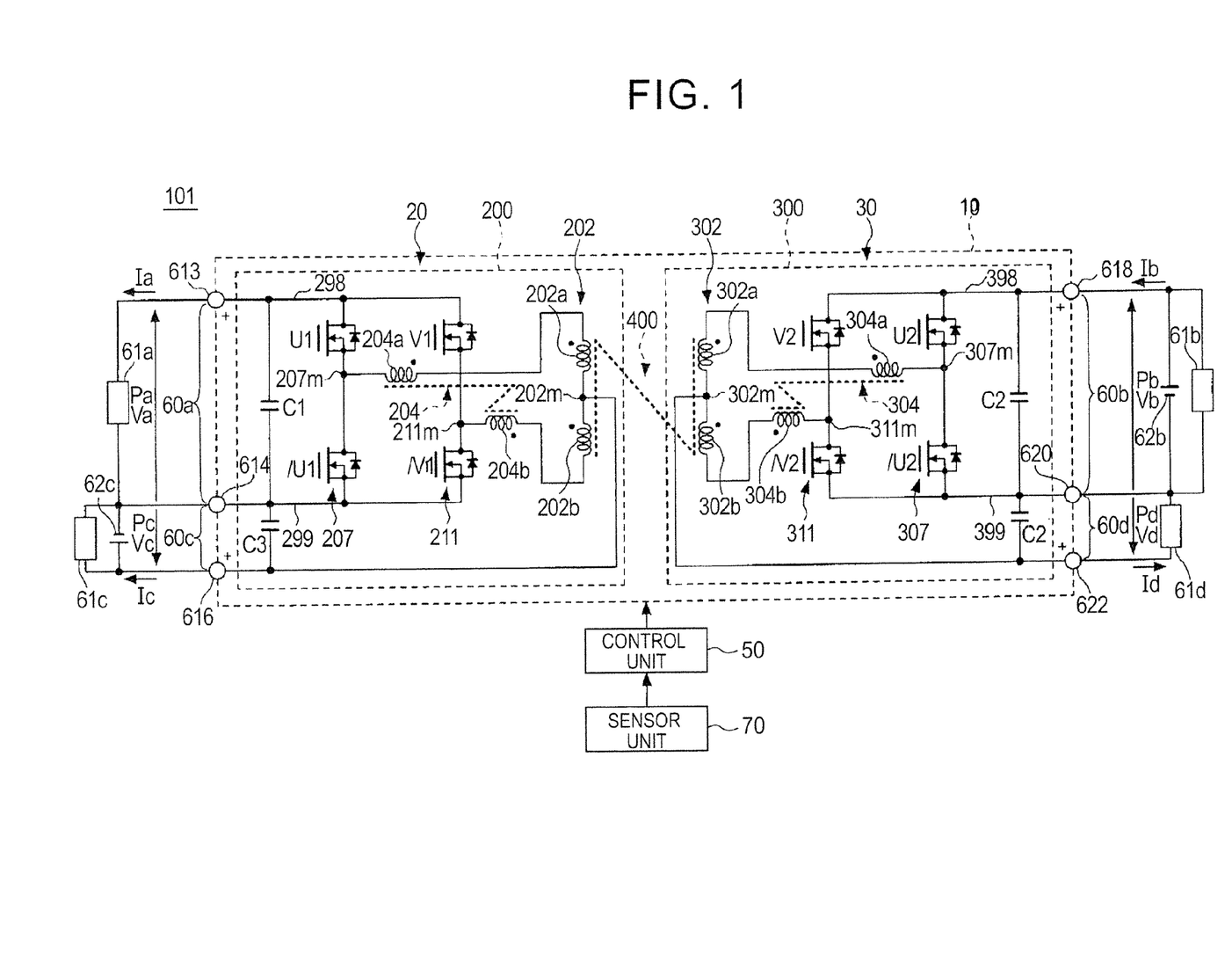
FIG. 1 is a block diagram showing an example of a configuration of a power supply apparatus serving as an embodiment of a power conversion apparatus according to the invention.

FIG. 1 is a block diagram showing an example of a configuration of a power supply apparatus 101 serving as an embodiment of a power conversion apparatus. For example, the power supply apparatus 101 is a power supply system that includes a power supply circuit 10, a control unit 50, and a sensor unit 70.

For example, the power supply apparatus 101 includes, as primary side ports, a first input/output port 60a to which a primary side high voltage system load 61a is connected and a second input/output port 60c to which a primary side low voltage system load 61c and a primary side low voltage system power supply 62c are connected. The primary side low voltage system power supply 62c supplies power to the primary side low voltage system load 61c, which is operated by an identical voltage system (a 12 V system, for example) to the primary side low voltage system power supply 62c. Further, the primary side low voltage system power supply 62c supplies power stepped up by a primary side conversion circuit 20 provided in the power supply circuit 10 to the primary side high voltage system load 61a, which is operated by a different voltage system (a higher 48 V system than the 12 V system, for example) to the primary side low voltage system power supply 62c. A secondary battery such as a lead battery may be cited as a specific example of the primary side low voltage system power supply 62c.

For example, the power supply apparatus 101 includes, as secondary side ports, a third input/output port 60b to which a secondary side high voltage system load 61b and a secondary side high voltage system power supply 62b are connected and a fourth input/output port 60d to which a secondary side low voltage system load 61d is connected. The secondary side high voltage system power supply 62b supplies power to the secondary side high voltage system load 61b, which is operated by an identical voltage system (a higher 288 V system than the 12 V system and the 48 V system, for example) to the secondary side high voltage system power supply 62h. Further, the secondary side high voltage system power supply 62b supplies power stepped down by a secondary side conversion circuit 30 provided in the power supply circuit 10 to the secondary side low voltage system load 61d, which is operated by a different voltage system (a lower 72 V system than the 288 V system, for example) to the secondary side high voltage system power supply 62b. A secondary battery such as a lithium ion battery may be cited as a specific example of the secondary side high voltage system power supply 62b.

The power supply circuit 10 is a power conversion circuit that includes the four input/output ports described above and has functions for selecting two desired input/output ports from the four input/output ports and performing power conversion between the two selected input/output ports.

Powers Pa, Pc, Pb, Pd are input/output powers (input powers or output powers) of the first input/output port 60a, the second input/output port 60c, the third input/output port 60b, and the fourth input/output port 60d, respectively. Voltages Va, Vc, Vb, Vd are input/output voltages (input voltages or output voltages) of the first input/output port 60a, the second input/output port 60c, the third input/output port 60b, and the fourth input/output port 60d, respectively. Currents Ia, Ic, Ib, Id are input/output currents (input currents or output currents) of the first input/output port 60a, the second input/output port 60c, the third input/output port 60b, and the fourth input/output port 60d, respectively.

The power supply circuit 10 includes a capacitor C1 provided in the first input/output port 60a, a capacitor C3 provided in the second input/output port 60c, a capacitor C2 provided in the third input/output port 60b, and a capacitor C4 provided in the fourth input/output port 60d. Film capacitors, aluminum electrolytic capacitors, ceramic capacitors, polymer electrolytic capacitors, and so on may be cited as specific examples of the capacitors C1, C2, C3, C4.

The capacitor C1 is inserted between a high potential side terminal 613 of the first input/output port 60a and a low potential side terminal 614 of the first input/output port 60a and the second input/output port 60c. The capacitor C3 is inserted between a high potential side terminal 616 of the second input/output port 60c and the low potential side terminal 614 of the first input/output port 60a and the second input/output port 60c. The capacitor C2 is inserted between a high potential side terminal 618 of the third input/output port 60b and a low potential side terminal 620 of the third input/output port 60b and the fourth input/output port 60d. The capacitor C4 is inserted between a high potential side terminal 622 of the fourth input/output port 60d and the low potential side terminal 620 of the third input/output port 60b and the fourth input/output port 60d.

The capacitors C1, C2, C3, C4 may be provided either inside or outside the power supply circuit 10.

The power supply circuit 10 is a power conversion circuit configured to include the primary side conversion circuit 20 and the secondary side conversion circuit 30. Note that the primary side conversion circuit 20 and the secondary side conversion circuit 30 are connected via a primary side magnetic coupling reactor 204 and a secondary side magnetic coupling reactor 304, and magnetically coupled by a transformer 400 (a center tapped transformer).

The primary side conversion circuit 20 is a primary side circuit configured to include a primary side full bridge circuit 200, the first input/output port 60a, and the second input/output port 60c. The primary side full bridge circuit 200 is a primary side power conversion unit configured to include a primary side coil 202 of the transformer 400, the primary side magnetic coupling reactor 204, a primary side first upper arm U1, a primary side first lower arm /U1, a primary side second upper arm V1, and a primary side second lower arm /V1. Here, the primary side first upper arm U1, the primary side first lower arm /U1, the primary side second upper arm V1, and the primary side second lower arm /V1 are constituted by switching elements respectively configured to include, for example, an N channel type metal oxide semiconductor field effect transistor (MOSFET) and a body diode serving as a parasitic element of the MOSFET. Additional diodes may be connected to the MOSFET in parallel.

The primary side full bridge circuit 200 includes a primary side positive electrode bus line 298 connected to the high potential side terminal 613 of the first input/output port 60a, and a primary side negative electrode bus line 299 connected to the low potential side terminal 614 of the first input/output port 60a and the second input/output port 60c.

A primary side first arm circuit 207 connecting the primary side first upper arm U1 and the primary side first lower arm /U1 in series is attached between the primary side positive electrode bus line 298 and the primary side negative electrode bus line 299. The primary side first arm circuit 207 is a primary side first power conversion circuit unit (a primary side U phase power conversion circuit unit) capable of performing a power conversion operation by switching the primary side first upper arm U1 and the primary side first lower arm /U1 ON and OFF. Further, a primary side second arm circuit 211 connecting the primary side second upper arm V1 and the primary side second lower arm /V1 in series is attached between the primary side positive electrode bus line 298 and the primary side negative electrode bus line 299 in parallel with the primary side first arm circuit 207. The primary side second arm circuit 211 is a primary side second power conversion circuit unit (a primary side V phase power conversion circuit unit) capable of performing a power conversion operation by switching the primary side second upper arm V1 and the primary side second lower arm /V1 ON and OFF.

The primary side coil 202 and the primary side magnetic coupling reactor 204 are provided in a bridge part connecting a midpoint 207m of the primary side first arm circuit 207 to a midpoint 211m of the primary side second arm circuit 211. To describe connection relationships to the bridge part in more detail, one end of a primary side first reactor 204a of the primary side magnetic coupling reactor 204 is connected to the midpoint 207m of the primary side first arm circuit 207, and one end of the primary side coil 202 is connected to another end of the primary side first reactor 204a. Further, one end of a primary side second reactor 204b of the primary side magnetic coupling reactor 204 is connected to another end of the primary side coil 202, and another end of the primary side second reactor 204b is connected to the midpoint 211m of the primary side second arm circuit 211. Note that the primary side magnetic coupling reactor 204 is configured to include the primary side first reactor 204a and the primary side second reactor 204b, which is magnetically coupled to the primary side first reactor 204a by a coupling coefficient $k_1$.

The midpoint 207m is a primary side first intermediate node between the primary side first upper arm U1 and the primary side first lower arm /U1, and the midpoint 211m is a primary side second intermediate node between the primary side second upper arm V1 and the primary side second lower arm /V1.

The first input/output port 60a is a port provided between the primary side positive electrode bus line 298 and the primary side negative electrode bus line 299. The first input/output port 60a is configured to include the terminal 613 and the terminal 614. The second input/output port 60c is a port provided between the primary side negative electrode bus line 299 and a center tap 202m of the primary side coil 202. The second input/output port 60c is configured to include the terminal 614 and the terminal 616.

The center tap 202m is connected to the high potential side terminal 616 of the second input/output port 60c. The center tap 202m is an intermediate connection point between a primary side first winding 202a and a primary side second winding 202b constituting the primary side coil 202.

The secondary side conversion circuit 30 is a secondary side circuit configured to include a secondary side full bridge circuit 300, the third input/output port 60b, and the fourth input/output port 60d. The secondary side full bridge circuit 300 is a secondary side power conversion unit configured to include a secondary side coil 302 of the transformer 400, the secondary side magnetic coupling reactor 304, a secondary side first upper arm U2, a secondary side first lower arm /U2, a secondary side second upper arm V2, and a secondary side second lower arm /V2. Here, the secondary side first upper arm U2, the secondary side first lower arm /U2, the secondary side second upper arm V2, and the secondary side second lower arm /V2 are constituted by switching elements respectively configured to include, for example, an N channel type MOSFET and a body diode serving as a parasitic element of the MOSFET. Additional diodes may be connected to the MOSFET in parallel.

The secondary side full bridge circuit 300 includes a secondary side positive electrode bus line 398 connected to the high potential side terminal 618 of the third input/output port 60b, and a secondary side negative electrode bus line 399 connected to the low potential side terminal 620 of the third input/output port 60b and the fourth input/output port 60d.

A secondary side first arm circuit 307 connecting the secondary side first upper arm U2 and the secondary side first lower arm /U2 in series is attached between the secondary side positive electrode bus line 398 and the secondary side negative electrode bus line 399. The secondary side first arm circuit 307 is a secondary side first power conversion circuit unit (a secondary side U phase power conversion circuit unit) capable of performing a power conversion operation by switching the secondary side first upper arm U2 and the secondary side first lower arm /U2 ON and OFF. Further, a secondary side second arm circuit 311 connecting the secondary side second upper arm V2 and the secondary side second lower arm /V2 in series is attached between the secondary side positive electrode bus line 398 and the secondary side negative electrode bus line 399 in parallel with the secondary side first arm circuit 307. The secondary side second arm circuit 311 is a secondary side second power conversion circuit unit (a secondary side V phase power conversion circuit unit) capable of performing a power conversion operation by switching the secondary side second upper arm V2 and the secondary side second lower arm /V2 ON and OFF.

The secondary side coil 302 and the secondary side magnetic coupling reactor 304 are provided in a bridge part connecting a midpoint 307m of the secondary side first arm circuit 307 to a midpoint 311m of the secondary side second arm circuit 311. To describe connection relationships to the bridge part in more detail, one end of a secondary side first reactor 304a of the secondary side magnetic coupling reactor 304 is connected to the midpoint 307m of the secondary side first arm circuit 307, and one end of the secondary side coil 302 is connected to another end of the secondary side first reactor 304a. Further, one end of a secondary side second reactor 304b of the secondary side magnetic coupling reactor 304 is connected to another end of the secondary side coil 302, and another end of the secondary side second reactor 304b is connected to the midpoint 311m of the secondary side second arm circuit 311. Note that the secondary side magnetic coupling reactor 304 is configured to include the secondary side first reactor 304a and the secondary side second reactor 304b, which is magnetically coupled to the secondary side first reactor 304a by a coupling coefficient $k_2$.

The midpoint 307m is a secondary side first intermediate node between the secondary side first upper arm U2 and the secondary side first lower arm /U2, and the midpoint 311m is a secondary side second intermediate node between the secondary side second upper arm V2 and the secondary side second lower arm /V2.

The third input/output port 60b is a port provided between the secondary side positive electrode bus line 398 and the secondary side negative electrode bus line 399. The third input/output port 60b is configured to include the terminal 618 and the terminal 620. The fourth input/output port 60d is a port provided between the secondary side negative electrode bus line 399 and a center tap 302m of the secondary side coil 302. The fourth input/output port 60d is configured to include the terminal 620 and the terminal 622.

The center tap 302m is connected to the high potential side terminal 622 of the fourth input/output port 60d. The center tap 302m is an intermediate connection point between a secondary side first winding 302a and a secondary side second winding 302b constituting the secondary side coil 302.

In FIG. 1, the power supply apparatus 101 includes the sensor unit 70. The sensor unit 70 serves as detecting means that detects an input/output value Y of at least one of the first to fourth input/output ports 60a, 60c, 60b, 60d at predetermined detection period intervals and outputs a detection value Yd corresponding to the detected input/output value Y to the control unit 50. The detection value Yd may be a detected voltage obtained by detecting the input/output voltage, a detected current obtained by detecting the input/output current, or a detected power obtained by detecting the input/output power. The sensor unit 70 may be provided either inside or outside the power supply circuit 10.

The sensor unit 70 includes, for example, a voltage detection unit that detects the input/output voltage generated in at least one of the first to fourth input/output ports 60a, 60c, 60b, 60d. For example, the sensor unit 70 includes a primary side voltage detection unit that outputs at least one detected voltage from among an input/output voltage Va and an input/output voltage Vc as a primary side voltage detection value, and a secondary side voltage detection unit that outputs at least one detected voltage from among an input/output voltage Vb and an input/output voltage Vd as a secondary side voltage detection value.

The voltage detection unit of the sensor unit 70 includes, for example, a voltage sensor that monitors an input/output voltage value of at least one port, and a voltage detection circuit that outputs a detected voltage corresponding to the input/output voltage value monitored by the voltage sensor to the control unit 50.

The sensor unit 70 includes, for example, a current detection unit that detects the input/output current flowing through at least one of the first to fourth input/output ports 60a, 60c, 60b, 60d. For example, the sensor unit 70 includes a primary side current detection unit that outputs at least one detected current from among an input/output current Ia and an input/output current Ic as a primary side current detection value, and a secondary side current detection unit that outputs at least one detected current from among an input/output current Ib and an input/output current Id as a secondary side current detection value.

The current detection unit of the sensor unit 70 includes, for example, a current sensor that monitors an input/output current value of at least one port, and a current detection circuit that outputs a detected current corresponding to the input/output current value monitored by the current sensor to the control unit 50.

The power supply apparatus 101 includes the control unit 50. For example, the control unit 50 is an electronic circuit that includes a microcomputer having an inbuilt central processing unit (CPU). The control unit 50 may be provided either inside or outside the power supply circuit 10.

The control unit 50 feedback-controls a power conversion operation performed by the power supply circuit 10 such that the detected value Yd of the input/output value Y of at least one of the first to fourth input/output ports 60a, 60c, 60b, 60d converges to a target value Ya set in the port. For example, the target value Ya is a command value set by the control unit 50 or a predetermined apparatus other than the control unit 50 on the basis of driving conditions defined in relation to the respective loads (the primary side low voltage system load 61c and so on, for example) connected to the input/output ports. The target value Ya functions as an output target value when power is output from the port and an input target value when power is input into the port, and may be a target voltage value, a target current value, or a target power value.

Further, the control unit 50 feedback-controls the power conversion operation performed by the power supply circuit 10 such that a transmitted power P transmitted between the primary side conversion circuit 20 and the secondary side conversion circuit 30 via the transformer 400 converges to a set target transmitted power Pa. The transmitted power will also be referred to as a power transmission amount. For example, the target transmitted power Pa is a command value set by the control unit 50 or a predetermined apparatus other than the control unit 50 on the basis of a deviation between the detected value Yd and the target value Ya in one of the ports.

The control unit 50 feedback-controls the power conversion operation performed by the power supply circuit 10 by varying a value of a predetermined control parameter X, and is thus capable of adjusting the respective input/output values Y of the first to fourth input/output ports 60a, 60c, 60b, 60d of the power supply circuit 10. Two control variables, namely a phase difference φ and a duty ratio D (an ON time δ) are used as the main control parameters X.

The phase difference φ is a deviation (a time lag) between switching timings of identical-phase power conversion circuit units of the primary side full bridge circuit 200 and the secondary side full bridge circuit 300. The duty ratio D (the ON time δ) is a duty ratio (an ON time) between switching waveforms of the respective power conversion circuit units constituting the primary side full bridge circuit 200 and the secondary side full bridge circuit 300.

The two control parameters X can be controlled independently of each other. The control unit 50 varies the input/output values Y of the respective input/output ports of the power supply circuit 10 by performing duty ratio control and/or phase control on the primary side full bridge circuit 200 and the secondary side full bridge circuit 300 using the phase difference φ and the duty ratio D (the ON time δ).

Figure 2:
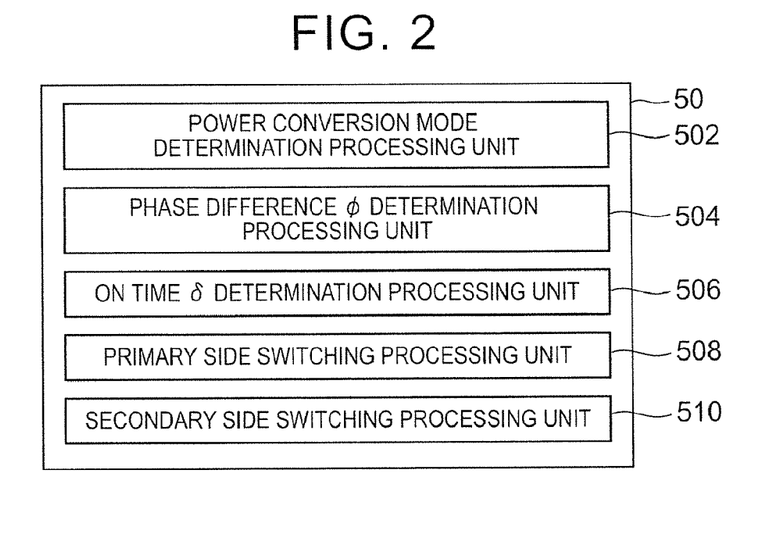
FIG. 2 is a block diagram showing an example of a configuration of a control unit according to this embodiment.

FIG. 2 is a block diagram of the control unit 50. The control unit 50 is a control unit having a function for performing switching control on the respective switching elements of the primary side conversion circuit 20, such as the primary side first upper arm U1, and the respective switching elements of the secondary side conversion circuit 30, such as the secondary side first upper arm U2. The control unit 50 is configured to include a power conversion mode determination processing unit 502, a phase difference φ determination processing unit 504, an ON time δ determination processing unit 506, a primary side switching processing unit 508, and a secondary side switching processing unit 510. For example, the control unit 50 is an electronic circuit that includes a microcomputer having an inbuilt CPU.

For example, the power conversion mode determination processing unit 502 selects and sets an operating mode from among power conversion modes A to L of the power supply circuit 10, to be described below, on the basis of a predetermined external signal (for example, a signal indicating the deviation between the detected value Yd and the target value Ya in one of the ports). As regards the power conversion modes, in mode A, power input from the first input/output port 60a is converted and output to the second input/output port 60c. In mode B, power input from the first input/output port 60a is converted and output to the third input/output port 60b. In mode C, power input from the first input/output port 60a is converted and output to the fourth input/output port 60d.

In mode D, power input from the second input/output port 60c is converted and output to the first input/output port 60a. In mode E, power input from the second input/output port 60c is converted and output to the third input/output port 60b. In mode F, power input from the second input/output port 60c is converted and output to the fourth input/output port 60d.

In mode G, power input from the third input/output port 60b is converted and output to the first input/output port 60a. In mode H, power input from the third input/output port 60b is converted and output to the second input/output port 60c. In mode I, power input from the third input/output port 60b is converted and output to the fourth input/output port 60d.

In mode J, power input from the fourth input/output port 60d is converted and output to the first input/output port 60a. In mode K, power input from the fourth input/output port 60d is converted and output to the second input/output port 60c. In mode L, power input from the fourth input/output port 60d is converted and output to the third input/output port 60b.

The phase difference φ determination processing unit 504 has a function for setting a phase difference φ between switching period motions of the switching elements between the primary side conversion circuit 20 and the secondary side conversion circuit 30 in order to cause the power supply circuit 10 to function as a direct current-direct current (DC-DC) converter circuit.

The ON time δ determination processing unit 506 has a function for setting an ON time δ of the switching elements of the primary side conversion circuit 20 and the secondary side conversion circuit 30 in order to cause the primary side conversion circuit 20 and the secondary side conversion circuit 30 to function respectively as step-up/step-down circuits.

The primary side switching processing unit 508 has a function for performing switching control on the respective switching elements constituted by the primary side first upper arm U1, the primary side first lower arm /U1, the primary side second upper arm V1, and the primary side second lower arm /V1, on the basis of outputs of the power conversion mode determination processing unit 502, the phase difference φ determination processing unit 504, and the ON time δ determination processing unit 506.

The secondary side switching processing unit 510 has a function for performing switching control on the respective switching elements constituted by the secondary side first upper arm U2, the secondary side first lower arm /U2, the secondary side second upper arm V2, and the secondary side second lower arm /V2, on the basis of the outputs of the power conversion mode determination processing unit 502, the phase difference φ, determination processing unit 504, and the ON time δ determination processing unit 506.

An operation of the power supply apparatus 101 having the above configuration will now be described using FIGS. 1 and 2. When, for example, an external signal requesting an operation in which the power conversion mode of the power supply circuit 10 is set at mode F is input, the power conversion mode determination processing unit 502 of the control unit 50 sets the power conversion mode of the power supply circuit 10 to mode F. At this time, a voltage input into the second input/output port 60c is stepped up by a step-up function of the primary side conversion circuit 20, whereupon power having the stepped-up voltage is transmitted to the third input/output port 60b side by a DC-DC converter circuit function of the power supply circuit 10, stepped down by a step-down function of the secondary side conversion circuit 30, and then output from the fourth input/output port 60d.

Here, a step-up/step-down function of the primary side conversion circuit 20 will be described in detail. Focusing on the second input/output port 60c and the first input/output port 60a, the terminal 616 of the second input/output port 60c is connected to the midpoint 207m of the primary side first arm circuit 207 via the primary side first winding 202a and the primary side first reactor 204a connected in series to the primary side first winding 202a. Respective ends of the primary side first arm circuit 207 are connected to the first input/output port 60a, and as a result, a step-up/step-down circuit is attached between the terminal 616 of the second input/output port 60c and the first input/output port 60a.

The terminal 616 of the second input/output port 60c is also connected to the midpoint 211m of the primary side second arm circuit 211 via the primary side second winding 202b and the primary side second reactor 204b connected in series to the primary side second winding 202b. Respective ends of the primary side second arm circuit 211 are connected to the first input/output port 60a, and as a result, a step-up/step-down circuit is attached in parallel between the terminal 616 of the second input/output port 60c and the first input/output port 60a. Note that since the secondary side conversion circuit 30 is a circuit having a substantially identical configuration to the primary side conversion circuit 20, two step-up/step-down circuits are likewise connected in parallel between the terminal 622 of the fourth input/output port 60d and the third input/output port 60b. Hence, the secondary side conversion circuit 30 has an identical step-up/step-down function to the primary side conversion circuit 20.

Next, the function of the power supply circuit 10 as a DC-DC converter circuit will be described in detail. Focusing on the first input/output port 60a and the third input/output port 60b, the primary side full bridge circuit 200 is connected to the first input/output port 60a, and the secondary side full bridge circuit 300 is connected to the third input/output port 60b. When the primary side coil 202 provided in the bridge part of the primary side full bridge circuit 200 and the secondary side coil 302 provided in the bridge part of the secondary side full bridge circuit 300 are magnetically coupled, the transformer 400 functions as a center tapped transformer having a number of windings 1:N. Hence, by adjusting the phase difference φ between the switching period motions of the switching elements in the primary side full bridge circuit 200 and the secondary side full bridge circuit 300, power input into the first input/output port 60a can be converted and transmitted to the third input/output port 60b or power input into the third input/output port 60b can be converted and transmitted to the first input/output port 60a.

Figure 3:
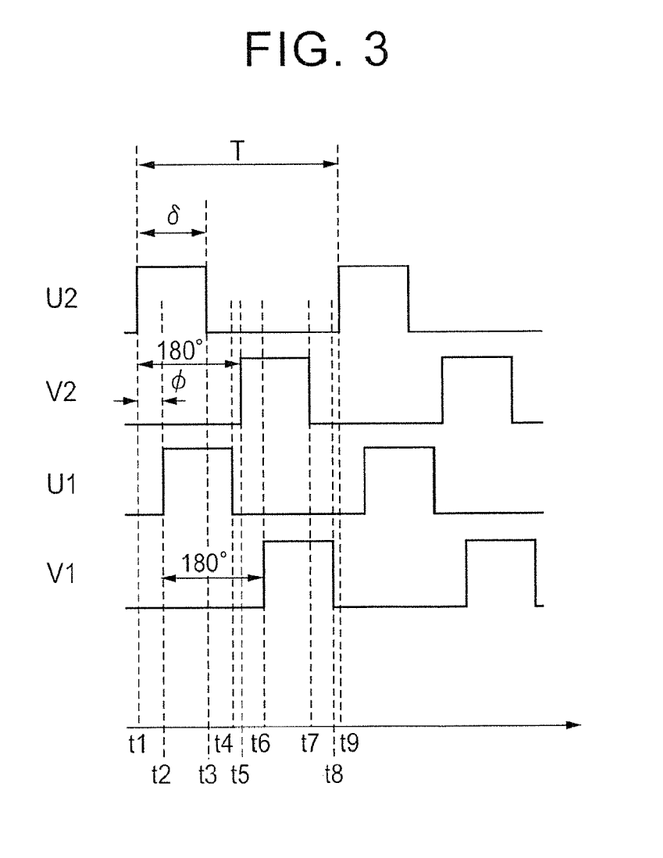
FIG. 3 is a timing chart showing an example of switching operations of a primary side circuit and a secondary side circuit according to this embodiment.

FIG. 3 is a view showing a timing chart of ON/OFF switching waveforms of the respective arms provided in the power supply circuit 10 resulting from control executed by the control unit 50. In FIG. 3, U1 is an ON/OFF waveform of the primary side first upper arm U1, V1 is an ON/OFF waveform of the primary side second upper arm V1, U2 is an ON/OFF waveform of the secondary side first upper arm U2, and V2 is an ON/OFF waveform of the secondary side second upper arm V2. ON/OFF waveforms of the primary side first lower arms /U1, the primary side second lower arm /V1, the secondary side first lower arm /U2, and the secondary side second lower arm /V2 are inverted waveforms (not shown) obtained by respectively inverting the ON/OFF waveforms of the primary side first upper arm U1, the primary side second upper arm V1, the secondary side first upper arm U2, and the secondary side second upper arm V2. Note that dead time is preferably provided between the respective ON/OFF waveforms of the upper and lower arms to prevent a through current from flowing when both the upper and lower arms are switched ON. Further, in FIG. 3, a high level indicates an ON condition and a low level indicates an OFF condition.

Here, by modifying the respective ON times δ of U1, V1, U2, and V2, step-up/step-down ratios of the primary side conversion circuit 20 and the secondary side conversion circuit 30 can be modified. For example, by making the respective ON times δ of U1, V1, U2, and V2 equal to each other, the step-up/step-down ratio of the primary side conversion circuit 20 can be made equal to the step-up/step-down ratio of the secondary side conversion circuit 30.

The ON time δ determination processing unit 506 make the respective ON times δ of U1, V1, U2, and V2 equal to each other (respective ON times δ=primary side ON time δ1=secondary side ON time δ2=time value α) so that the respective step-up/step-down ratios of the primary side conversion circuit 20 and the secondary side conversion circuit 30 are equal to each other.

The step-up/step-down ratio of the primary side conversion circuit 20 is determined by the duty ratio D, which is a proportion of a switching period T of the switching elements (arms) constituting the primary side full bridge circuit 200 occupied by the ON time δ. Similarly, the step-up/step-down ratio of the secondary side conversion circuit 30 is determined by the duty ratio D, which is a proportion of the switching period T of the switching elements (arms) constituting the secondary side full bridge circuit 300 occupied by the ON time S. The step-up/step-down ratio of the primary side conversion circuit 20 is a transformation ratio between the first input/output port 60a and the second input/output port 60c, while the step-up/step-down ratio of the secondary side conversion circuit 30 is a transformation ratio between the third input/output port 60b and the fourth input/output port 60d.

Therefore, for example, the step-up/step-down ratio of the primary side conversion circuit 20

= the voltage of the second input/output port 60c/the voltage of the first input/output port 60a

= δ1/T=α/T, and the step-up/step-down ratio of the secondary side conversion circuit 30

= the voltage of the fourth input/output port 60d/the voltage of the third input/output port 60b

= δ2/T=α/T.

In other words, the respective step-up/step-down ratios of the primary side conversion circuit 20 and the secondary side conversion circuit 30 take identical values (=α/T).

Note that the ON time δ in FIG. 3 represents both the ON time δ of the primary side first upper arm U11 and the primary side second upper arm V1 and the ON time 82 of the secondary side first upper arm U2 and the secondary side second upper arm V2. Further, the switching period T of the arms constituting the primary side full bridge circuit 200 and the switching period T of the arms constituting the secondary side full bridge circuit 300 are equal times.

Furthermore, a phase difference between U1 and V1 is activated at 180 degrees (π), and a phase difference between U2 and V2 is likewise activated at 180 degrees (π). Moreover, by changing the phase difference φ between U1 and U2, the power transmission amount P between the primary side conversion circuit 20 and the secondary side conversion circuit 30 can be adjusted such that when the phase difference φ>0, power can be transmitted from the primary side conversion circuit 20 to the secondary side conversion circuit 30, and when the phase difference φ<0, power can be transmitted from the secondary side conversion circuit 30 to the primary side conversion circuit 20.

The phase difference φ is a deviation (a time lag) between the switching timings of identical-phase power conversion circuit units of the primary side full bridge circuit 200 and the secondary side full bridge circuit 300. For example, the phase difference φ is a deviation between the switching timings of the primary side first arm circuit 207 and the secondary side first arm circuit 307, and a deviation between the switching timings of the primary side second arm circuit 211 and the secondary side second arm circuit 311. These deviations are controlled to be equal to each other. In other words, the phase difference φ between U1 and U2 and the phase difference φ between V1 and V2 are controlled to identical values.

Hence, when, for example, an external signal requesting an operation in which the power conversion mode of the power supply circuit 10 is set at mode F is input, the power conversion mode determination processing unit 502 selects and sets mode F. The ON time S determination processing unit 506 then sets the ON time δ to define a step-up ratio required when the primary side conversion circuit 20 is caused to function as a step-up circuit that steps up the voltage input into the second input/output port 60c and outputs the stepped-up voltage to the first input/output port 60a. Note that the secondary side conversion circuit 30 functions as a step-down circuit that steps down the voltage input into the third input/output port 60b at a step-down ratio defined in accordance with the ON time δ set by the ON time δ determination processing unit 506, and outputs the stepped-down voltage to the fourth input/output port 60d. Further, the phase difference φ determination processing unit 504 sets the phase difference φ such that the power input into the first input/output port 60a is transmitted to the third input/output port 60b in the desired power transmission amount P.

The primary side switching processing unit 508 performs switching control on the respective switching elements constituted by the primary side first upper arm U1, the primary side first lower arm /U1, the primary side second upper arm V1, and the primary side second lower arm /V1 to cause the primary side conversion circuit 20 to function as a step-up circuit and to cause the primary side conversion circuit 20 to function as a part of a DC-DC converter circuit.

The secondary side switching processing unit 510 performs switching control on the respective switching elements constituted by the secondary side first upper arm U2, the secondary side first lower arm /U2, the secondary side second upper arm V2, and the secondary side second lower arm /V2 to cause the secondary side conversion circuit 30 to function as a step-down circuit and to cause the secondary side conversion circuit 30 to function as a part of a DC-DC converter circuit.

As described above, the primary side conversion circuit 20 and the secondary side conversion circuit 30 can be caused to function as a step-up circuit or a step-down circuit, and the power supply circuit 10 can be caused to function as a bidirectional DC-DC converter circuit. Therefore, power conversion can be performed in all of the power conversion modes A to L, or in other words, power conversion can be performed between two input/output ports selected from the four input/output ports.

The transmitted power P (also referred to as the power transmission amount P) adjusted by the control unit 50 in accordance with the phase difference φ is power transmitted from one of the primary side conversion circuit 20 and the secondary side conversion circuit 30 to the other via the transformer 400, and is expressed as $$P=(N \times Va \times Vb)/(\pi \times \omega \times L) \times F(D,\phi)$$  Equation 1.

Note that N is a winding ratio of the transformer 400, Va is the input/output voltage of the first input/output port 60a, Vb is the input/output voltage of the third input/output port 60b, π is pi, ω(=2π×f=2π/T) is an angular frequency, f is a switching frequency of the primary side conversion circuit 20 and the secondary side conversion circuit 30, T is the switching period of the primary side conversion circuit 20 and the secondary side conversion circuit 30, L is an equivalent inductance of the transformer 400 and the magnetic coupling reactors 204, 304 relating to power transmission, and F (D, φ) is a function having the duty ratio D and the phase difference φ as variables and a variable that increases monotonically as the phase difference φ increases, independently of the duty ratio D. The duty ratio D and the phase difference φ are control parameters designed to vary within a range sandwiched between predetermined upper and lower limit values.

Figure 4:
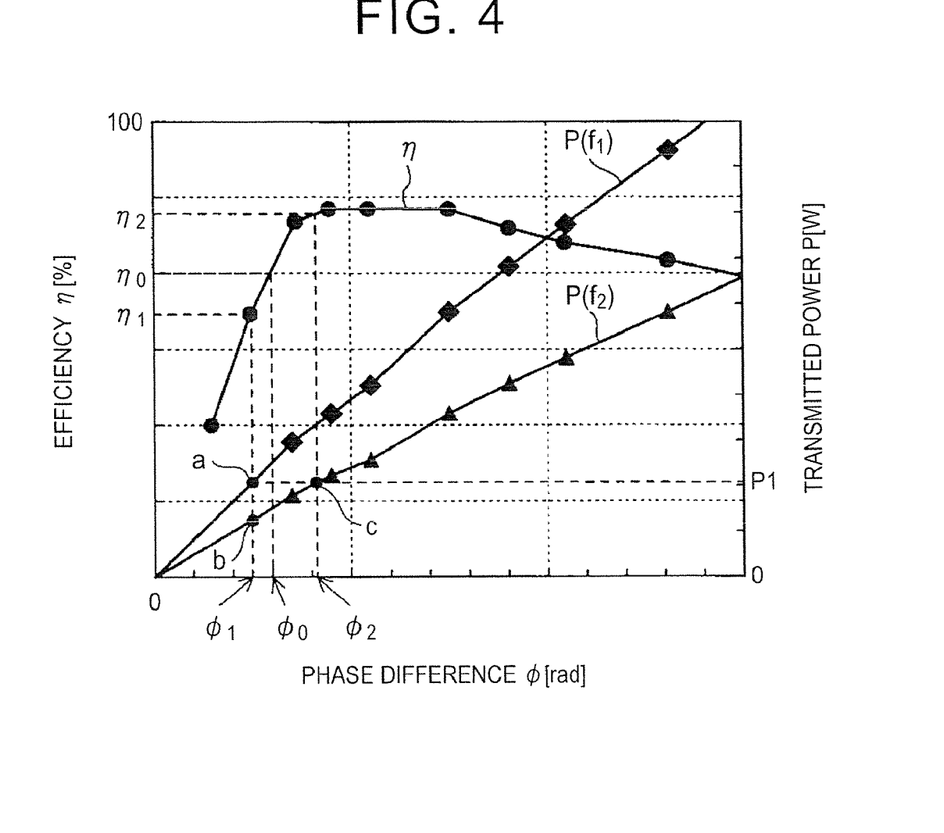
FIG. 4 is a graph showing the relationship among a phase difference, a transmitted power, and power conversion efficiency according to this embodiment.

Consequently, as shown in FIG. 4, as the phase difference φ is increased, the transmitted power P is monotonously increased. $P(f_1)$ represents a change of the transmitted power P relative to the phase difference φ when the switching frequency f is fixed to a predetermined frequency $f_1$, while $P(f_2)$ represents a change of the transmitted power P relative to the phase difference φ when the switching frequency f is fixed to a predetermined frequency $f_2$ ($f_1 < f_2$).

FIG. 4 is a graph showing the relationship among the phase difference φ, the transmitted power P, and efficiency η. The efficiency η. Th efficiency η is power conversion efficiency between the primary side port of the primary side conversion circuit 20 and the secondary side port of the secondary side conversion circuit 30, and is represented by a ratio of output power to input power. When the input power inputted from one of the primary side port and the secondary side port is defined as Pin, the output power outputted from the other one of the primary side port and the secondary side port is defined as Pout, the input voltage inputted from one of the primary side port and the secondary side port is defined as Vin, the output voltage outputted from the other one of the primary side port and the secondary side port is defined as Vout, the input current inputted from one of the primary side port and the secondary side port is defined as Iin, and the output current outputted from the other one of the primary side port and the secondary side port is defined as Iout, the efficiency is represented by the following Equation:

$$\eta = Pout/Pin \qquad \text{Equation 2}$$
$$= (Vout \times Iout)/(Vin \times Iin).$$

For example, in FIG. 1, when the power Pb inputted from the third input/output port 60b is converted, the power Pa after the conversion is outputted to the first input/output port 60a, the power Pa of the first input/output port 60a is converted, and the power Pc after the conversion is outputted to the second input/output port 60c, in accordance with Equation 2, the efficiency $\eta$ can be represented by the following Equation:

$$\eta = (Va \times Ia + Vc \times Ic)/(Yb \times Ib) \qquad \text{Equation 3.}$$

Note that Equation 3 is Equation in the case where the fourth input/output port 60d is not used, and power inputted or outputted to or from the fourth input/output port 60d is assumed to be zero (e.g., the secondary side low voltage system load 61d and the capacitor C4 are not provided).

As shown in FIG. 4, in the power supply circuit 10, there are cases where the efficiency $\eta$ is reduced to a smaller value as the phase difference $\phi$ is smaller. To cope with this, when the reduction in efficiency $\eta$ is detected ("detect" may also mean "presume"), the control unit 50 performs control in which the switching frequency f is increased and the phase difference $\phi$ is increased such that the efficiency $\eta$ is increased. With this control, it is possible to suppress the reduction in efficiency $\eta$.

Since the transmitted power P is determined by Equation 1, the control unit 50 can reduce the transmitted power P by increasing the switching frequency f ($=\omega/2\pi$), and increase the transmitted power P by increasing the phase difference $\phi$. Consequently, for example, as shown in FIG. 4, by increasing the switching frequency f from $f_1$ to $f_2$ and increasing the phase difference $\phi$ to from $\phi_1$ to $\phi_2$, it is possible to shift the operating point of the power supply circuit 10 from an operating point a at efficiency $\eta_1$ to an operating point c at efficiency $\eta_2$ ($>\eta_1$).

For example, when it is detected that the efficiency $\eta_1$ is less than a set threshold value $\eta_0$, the control unit 50 performs the control in which the switching frequency f is increased and the phase difference $\phi$ is increased such that the efficiency $\eta_1$ is increased to a value not less than the set threshold value $\eta_0$. With this, it is possible to reliably suppress the reduction in efficiency $\eta$. The set threshold value $\eta_0$ is a predetermined efficiency reference value used for detecting the reduction in efficiency $\eta$, and is a value larger than the efficiency $\eta_1$ and smaller than the efficiency $\eta_2$.

The efficiency $\eta$ is derived according to Equation 2 (particularly Equation 3) on the basis of the detected value Yd outputted from the sensor unit 70 (specifically, a detected value outputted from each of the primary side voltage detection unit, the primary side current detection unit, the secondary side voltage detection unit, and the secondary side current detection unit). For example, the control unit 50 substitutes the detected value Yd into Equation 2 or Equation 3 to thereby calculate the efficiency $\eta$. The control unit 50 performs control in which the switching frequency f and the phase difference $\phi$ are changed in accordance with the calculated efficiency Alternatively, the efficiency $\eta$ may be derived on the basis of, e.g., the correlation between the phase difference $\phi$ and the efficiency $\eta$. For example, the correlation between the phase difference $\phi$ and the efficiency $\eta$ is measured in advance at the time of production of the power supply circuit 10 in a factory, and a map or a program constant having the measured correlation therebetween is pre-stored in a storage device provided in the control unit 50. With this, the control unit 50 can derive the efficiency $\eta$ corresponding to the phase difference $\phi$ in according with the map stored in the storage device. In addition, since the efficiency $\eta$ is derived on the basis of the correlation between the phase difference $\phi$ and the efficiency it is possible to estimate the efficiency on the basis of the phase difference $\phi$ without the current detection unit provided in the sensor unit 70. As a result, it is possible to achieve, e.g., a reduction in the arithmetic load of the control unit 50, an improvement in the responsiveness of the control unit 50, and a reduction in the cost of the power supply apparatus 101.

In addition, when it is detected that the phase difference $\phi$ is less than a set threshold value $\phi_0$, the control unit 50 may perform the control in which the switching frequency f is increased and the phase difference $\phi$ is increased such that the phase difference $\phi$ is increased to a value not less than the threshold value $\phi_0$. That is, since the correlation exists between the phase difference $\phi$ and the efficiency the control unit 50 performs the control in which the switching frequency f and the phase difference $\phi$ are changed in accordance with the phase difference $\phi$ such that the efficiency $\eta$ is increased. With this, it is possible to reliably suppress the reduction in efficiency $\eta$. The set threshold value $\phi_0$ is a predetermined phase difference reference value used for detecting the reduction in efficiency $\eta$, and is a value larger than the phase difference $\phi_1$ and smaller than the phase difference $\phi_2$. The set threshold value $\phi_0$ is, e.g., a phase difference when the efficiency $\eta$ is the set threshold value The control unit 50 preferably performs, e.g., control in which the phase difference $\phi$ is increased by increasing the switching frequency f. With this, it is possible to suppress a fluctuation amount of the transmitted power P caused by the change in each of the switching frequency f and the phase difference $\phi$ to a level lower than a level when control in which the switching frequency f is increased after the phase difference $\phi$ is increased is performed.

Since the transmitted power P is determined by Equation 1, the transmitted power P is reduced by increasing the switching frequency f ($=\omega/2\pi$) by the control unit 50 even when the phase difference $\phi$ is unchanged. For example, as shown in FIG. 4, with an increase in switching frequency f from $f_1$ to $f_2$, the operating point of the power supply circuit 10 is shifted from the operating point a at the phase difference $\phi_1$ on the curve of $P(f_1)$ to the operating point b at the same phase difference $\phi_1$ on the curve of $P(f_2)$, and hence the transmitted power P is reduced. However, since the control unit 50 performs the control in which the phase difference ϕ is increased by increasing the switching frequency f, the phase difference ϕ is increased from ϕ₁. As the phase difference ϕ is increased from ϕ₁, the transmitted power P is increased and the efficiency is also increased from In particular, in the case where the control unit 50 increases the phase difference ϕ such that the transmitted power P converges to target transmitted power P1, the operating point of the power supply circuit 10 is shifted from the operating point b at the phase difference ϕ₁ to the operating point c at the phase difference ϕ₂ along the curve of P(f₂). With this, even in the case where the transmitted power P is shifted from the target transmitted power P1 by the change of the switching frequency f when the power supply circuit 10 operates at the operating point a at which the transmitted power P converges to the target transmitted power P1, it is possible to cause the transmitted power P to converge to the target transmitted power P1 again. In addition, the phase difference ϕ is increased from ϕ₁ to ϕ₂, and hence the efficiency η is also increased from η₁ to η₂.

In the case where the target transmitted power P1 is further increased when the power supply circuit 10 operates at the operating point c, the control unit 50 can increase the transmitted power P by reducing the switching frequency f from the frequency f₂. For example, the control unit 50 sets the switching frequency f back to the original value f₁ before the change. Subsequently, the control unit 50 changes the phase difference ϕ such that the transmitted power P follows the increase of the target transmitted power P1. With this, it is possible to cause the transmitted power P to converge to the increased target transmitted power P1.

Figure 5:
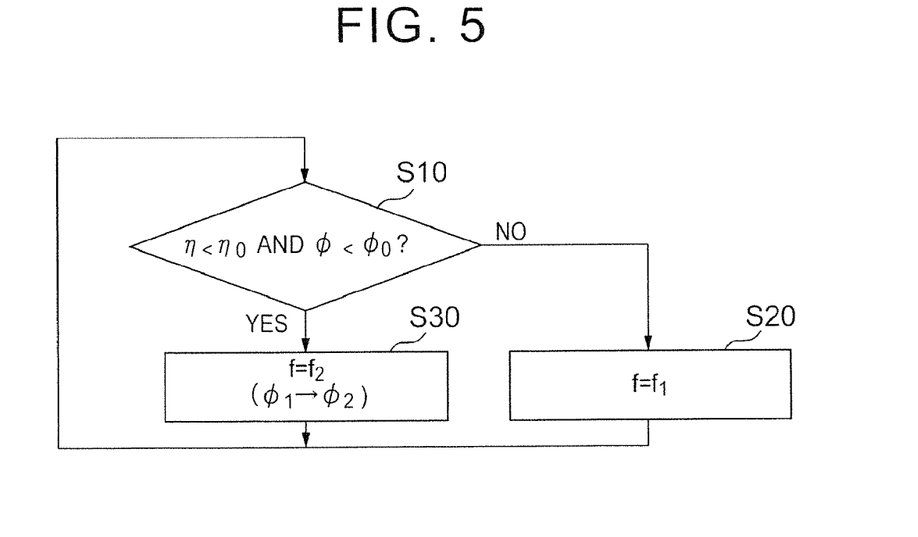
FIG. 5 is a flowchart showing an example of a power conversion method according to the invention.

FIG. 5 is a flowchart showing an example of a power conversion method. The control unit 50 determines whether it is detected that the efficiency η is less than the set threshold value η₀ and the phase difference ϕ is less than the set threshold value ₀ (step S10).

When it is detected that the efficiency η₁ is less than the set threshold value 110 and the phase difference ϕ is less than the set threshold value ₀, the control unit 50 sets the switching frequency f to f₂ (step S30). For example, in the case where the switching frequency f is set to f₁, when it is detected that the efficiency η is less than the set threshold value η₀ and the phase difference ϕ is less than the set threshold value η₀, the control unit 50 increases the switching frequency f from f₁ to f₂. When the switching frequency f is increased from f₁ to f₂, as described above, the phase difference ϕ is thereby increased from ϕ₁ to ϕ₂, and hence the efficiency η₁ is increased. Alternatively, for example, in the case where the switching frequency f is set to f₂, when it is detected that the efficiency η₁ is less than the set threshold value η₀ and the phase difference ϕ is less than the set threshold value η₀, the efficiency η is still low, and hence the control unit 50 keeps the switching frequency f at f₂ continuously.

On the other hand, when it is detected that the efficiency η is not less than the set threshold value η₀ and/or the phase difference ϕ is not less than the set threshold value η₀, the control unit 50 sets the switching frequency f to f₁ (step S20). For example, in the case where the switching frequency f is set to f₁, when it is detected that the efficiency η is not less than the set threshold value η₀ and/or the phase difference ϕ is not less than the set threshold value η₀, the control unit 50 keeps the switching frequency f at f₁ continuously. Alternatively, for example, in the case where the switching frequency f is set to f₂, when it is detected that the efficiency η is not less than the set threshold value η₀ and/or the phase difference ϕ is not less than the set threshold value η₀, the control unit 50 reduces the switching frequency f from f₂ to f₁. By reducing the switching frequency f, it is possible to increase the maximum value of the transmittable transmitted power P even when the phase difference ϕ is unchanged.

An embodiment of the power conversion apparatus and power conversion method was described above, but the invention is not limited to the above embodiment, and various amendments and improvements, such as combining or replacing the above embodiment either partially or wholly with another embodiment, may be implemented within the scope of the invention.

For example, in the case where the control unit 50 performs control in which the phase difference ϕ is changed such that the transmitted power P converges to the target transmitted power Pa, when it is detected that the target transmitted power Pa is less than a set threshold value P₀, the control unit 50 may perform the control in which the phase difference ϕ is increased by increasing the switching frequency f. With this control, in the case where a command for the target transmitted power Pa less than the set threshold value P₀ is issued, it is possible to prevent a situation in which the phase difference ϕ is controlled to be small in accordance with the command, and the efficiency η is reduced.

In addition, when it is detected that the target transmitted power Pa is not less than the set threshold value P₀, the control unit 50 may perform the control in which the switching frequency f is reduced from f2 to f₁. With this control, in the case where a command for the target transmitted power Pa not less than the set threshold value P₀ is issued, it is possible to prevent the transmitted power P from becoming short of the target transmitted power Pa.

Further, for example, in the above embodiment, a MOSFET, which is a semiconductor element subjected to an ON/OFF operation, was cited as an example of the switching element. However, the switching element may be a voltage control type power element using an insulating gate such as an insulated gate bipolar transistor (IGBT) or a MOSFET, or a bipolar transistor, for example.

Further, a power supply may be connected to the first input/output port 60a, and a power supply may be connected to the fourth input/output port 60d. Furthermore, a power supply need not be connected to the second input/output port 60c, and a power supply need not be connected to the third input/output port 60b.

What is claimed is:
1. A power conversion apparatus comprising:
   a primary side circuit having a primary side first arm circuit and a primary side second arm circuit;
   a secondary side circuit magnetically coupled to the primary side circuit via a transformer, the secondary side circuit having a secondary side first arm circuit and a secondary side second arm circuit; and
   a control unit configured to increase a frequency of switching of each of the primary side circuit and the secondary side circuit and a phase difference between the switching of the primary side circuit and the switching of the secondary side circuit such that power conversion efficiency between the primary side circuit and the secondary side circuit is increased,
   wherein the phase difference is a time lag between the switching timings of the primary side first arm circuit and the secondary side first arm circuit, and a time lag between the switching timings of the primary side second arm circuit and the secondary side second arm circuit, wherein the time lag between the switching timing of the primary side first arm circuit and the secondary side first arm circuit and the time lag between the switching timing of the primary side second arm circuit and the secondary side second arm circuit are controlled to be equal to each other.

2. The power conversion apparatus according to claim 1, wherein the control unit increases the phase difference by increasing the frequency.

3. The power conversion apparatus according to claim 1, wherein the control unit reduces transmitted power transmitted between the primary side circuit and the secondary side circuit by increasing the frequency, and increases the transmitted power by increasing the phase difference.

4. The power conversion apparatus according to claim 3, wherein the control unit increases the phase difference such that the transmitted power converges to target power.

5. The power conversion apparatus according to claim 4, wherein the control unit increases the transmitted power by reducing the frequency when the target power is increased.

6. The power conversion apparatus according to claim 5, wherein the control unit reduces the frequency when at least one of the power conversion efficiency, the phase difference, and the target power is not less than a set threshold value.

7. The power conversion apparatus according to claim 5, wherein the control unit changes the phase difference such that the transmitted power follows the increase of the target power.

8. The power conversion apparatus according to claim 1, wherein the control unit increases the frequency and the phase difference when at least one of the power conversion efficiency and the phase difference is less than a set threshold value.

9. The power conversion apparatus according to claim 1, further comprising:
a primary side voltage detection unit detecting an input/output voltage of the primary side circuit;
a primary side current detection unit detecting an input/output current of the primary side circuit;
a secondary side voltage detection unit detecting an input/output voltage of the secondary side circuit; and
a secondary side current detection unit detecting an input/output current of the secondary side circuit,
wherein the power conversion efficiency is directly derived on the basis of detected values outputted from the primary side voltage detection unit, the primary side current detection unit, the secondary side voltage detection unit, and the secondary side current detection unit.

10. The power conversion apparatus according to claim 1, wherein the control unit changes the phase difference such that transmitted power transmitted between the primary side circuit and the secondary side circuit converges to target power, and increases the frequency and the phase difference when the target power is less than a set threshold value.

11. The power conversion apparatus according to claim 10, wherein the power conversion efficiency is derived on the basis of a correlation between the power conversion efficiency and the phase difference.

12. A power conversion apparatus comprising:
a primary side circuit having a primary side first arm circuit and a primary side second arm circuit;
a secondary side circuit magnetically coupled to the primary side circuit via a transformer, the secondary side circuit having a secondary side first arm circuit and a secondary side second arm circuit,
wherein power conversion efficiency between the primary side circuit and the secondary side circuit is reduced to a smaller value as a phase difference between switching of the primary side circuit and switching of the secondary side circuit is smaller; and
a control unit configured to increase the phase difference by increasing a frequency of the switching of each of the primary side circuit and the secondary side circuit,
wherein the phase difference is a time lag between the switching timings of the primary side first arm circuit and the secondary side first arm circuit, and a time lag between the switching timings of the primary side second arm circuit and the secondary side second arm circuit,
wherein the time lag between the switching timing of the primary side first arm circuit and the secondary side first arm circuit and the time lag between the switching timing of the primary side second arm circuit and the secondary side second arm circuit are controlled to be equal to each other.

13. A power conversion method comprising:
increasing a frequency of switching of each of a primary side circuit and a secondary side circuit magnetically coupled to the primary side circuit via a transformer, and a phase difference between the switching of the primary side circuit and the switching of the secondary side circuit in accordance with power conversion efficiency between the primary side circuit and the secondary side circuit,
wherein the primary side circuit includes a primary side first arm circuit and a primary side second arm circuit and the secondary side circuit includes a secondary side first arm circuit and a secondary side second arm circuit,
wherein the phase difference is a time lag between the switching timings of the primary side first arm circuit and the secondary side first arm circuit, and a time lag between the switching timings of the primary side second arm circuit and the secondary side second arm circuit,
wherein the time lag between the switching timing of the primary side first arm circuit and the secondary side first arm circuit and the time lag between the switching timing of the primary side second arm circuit and the secondary side second arm circuit are controlled to be equal to each other.

14. The power conversion method according to claim 13, wherein the frequency and the phase difference are changed when a reduction in the power conversion efficiency is detected.

* * * * *

UNITED STATES PATENT AND TRADEMARK OFFICE
CERTIFICATE OF CORRECTION

PATENT NO. : 9,438,125 B2  
APPLICATION NO. : 14/282405  
DATED : September 6, 2016  
INVENTOR(S) : Jun Muto Page 1 of 1

It is certified that error appears in the above-identified patent and that said Letters Patent is hereby corrected as shown below:

IN THE SPECIFICATION  
In Column 4, Line 23, delete "atm /U1" abd insert --arm /U1--, therefor.

Signed and Sealed this  
Fifteenth Day of November, 2016

Michelle K. Lee  
*Director of the United States Patent and Trademark Office*